United States Patent [19]

Dewberry et al.

[11] 4,013,992

[45] Mar. 22, 1977

[54] DIVER'S PIEZOELECTRIC MICROPHONE WITH INTEGRAL AGC PREAMPLIFIER

[75] Inventors: Larry F. Dewberry; Robert H. Banks; Clell A. Dildy, all of Panama City, Fla.

[73] Assignee: The United States of America as represented by the Secretary of the Navy, Washington, D.C.

[22] Filed: Jan. 28, 1976

[21] Appl. No.: 653,186

[52] U.S. Cl. .................................. 340/10; 310/9.1; 340/8 R

[51] Int. Cl.² .......................................... H04B 13/00

[58] Field of Search ............... 340/8 R, 8 LF, 8 PC, 340/9-14; 310/9.1

[56] References Cited

UNITED STATES PATENTS

| | | | |
|---|---|---|---|
| 2,551,556 | 5/1951 | Brennan | 340/14 X |
| 2,755,343 | 7/1956 | Levy | 340/8 R X |
| 3,073,916 | 1/1963 | Williams et al. | 340/8 R X |
| 3,281,769 | 10/1966 | Hueter | 340/8 LF |
| 3,331,970 | 7/1967 | Dundon et al. | 340/10 X |
| 3,387,149 | 6/1968 | Young | 310/9.1 X |
| 3,562,451 | 2/1971 | Mullen, Jr. et al. | 340/10 X |
| 3,708,702 | 1/1973 | Brunnert | 340/10 |
| 3,775,749 | 11/1973 | Tegholm | 340/15.5 GC |
| 3,879,726 | 4/1975 | Sweany | 310/9.1 |

FOREIGN PATENTS OR APPLICATIONS

| | | | |
|---|---|---|---|
| 2,136,402 | 2/1973 | Germany | 340/10 |

*Primary Examiner*—Harold Tudor
*Attorney, Agent, or Firm*—Richard S. Sciascia; Don D. Doty; Harvey A. David

[57] ABSTRACT

An improved microphone assembly for use in a diver's mask or helmet and which is characterized by a substantially flat frequency response at pressures from 1 to 30 or more atmospheres of breathing gas. A silicone rubber coated piezoelectric diaphragm is mounted by its periphery in a cylindrical housing with both sides of the diaphragm exposed to ambient gas pressures. A ground plate is mounted in said housing with one side in spaced relation to the diaphragm and having on the other side thereof a preamplifier and automatic gain control circuit electrically connected to the diaphragm and encased in waterproof potting compound.

2 Claims, 4 Drawing Figures

DIVER'S PIEZOELECTRIC MICROPHONE WITH INTEGRAL AGC PREAMPLIFIER

BACKGROUND OF THE INVENTION

This invention relates to electro-acoustic transducers and more particularly to an improved piezoelectric microphone suitable for use by divers at substantial depths.

Piezoelectric microphones have been utilized heretofore within diver's full face masks, helmets, and the like. One example is found in U.S. Pat. No. 3,562,451 issued to W. W. Mullen, Jr. The microphones disclosed therein utilize a piezoelectric bimorph in the form of a diaphragm that is waterproofed by being embedded in an elastomeric compound such as a silicone rubber material that is confined in a metal cup. Such microphone constructions have proven to be rugged, capable of withstanding water immersion under pressure, and to be conveniently small in size. While those microphones have served well at shallower depths, they suffer a marked degradation of sensitivity as depths and pressures increase, so much so that at depths of say 600 to 1000 feet, or more, they are not at all satisfactory.

Another disadvantage of piezoelectric microphones for diver use, is the high electrical impedance characteristics thereof that have required preamplifier devices to be carried by the diver in order to effectively couple the microphone with the remainder of the communication system.

Of course the problems of loss of sensitivity apply as well to piezoelectric transducers having similar construction and used as receivers or headphones.

SUMMARY OF THE INVENTION

The invention aims to overcome some or most of the disadvantages of the prior art through the provision of an electroacoustic transducer construction, e.g., as a piezoelectric microphone, wherein the piezoelectric diaphragm is mounted by its peripheral portions in a cylindrical housing, with both sides of the diaphragm exposed to ambient pressures. The invention is further characterized by a ground or shield plate mounted in the housing with one side in spaced relation to the diaphragm and the other side defining an end wall of a cavity in which an A.G.C. (automatic gain control) preamplifier is disposed and encased in waterproof potting compound.

With the foregoing in mind, it is a principal object of the invention to provide an improved piezoelectric microphone for use by divers.

Another object of the invention is the provision of a piezoelectric microphone for underwater use that retains useful sensitivity throughout a range of pressures from 1 to 30 or more atmospheres.

Still another object is to provide a compact, unitary, and rugged microphone package including a piezoelectric diaphragm together with an electronic preamplifier circuit including automatic gain control.

Yet another object is to avoid degradation of response sensitivity with increases in ambient pressure through the use of an air backed diaphragm mounted in a cylindrical housing having a plurality of ports in the wall thereof in combination with relieved zones which permit ambient pressure communication with those ports when the housing is disposed in a rubber sleeve, boot, mouthpiece, or the like.

The invention may be further said to reside in certain novel constructions, combinations, and arrangements of parts by which the foregoing objects and advantages are achieved, as well as others which will become apparent from the following description of a preferred embodiment.

DESCRIPTION OF THE PREFERRED EMBODIMENT

Figure 1:
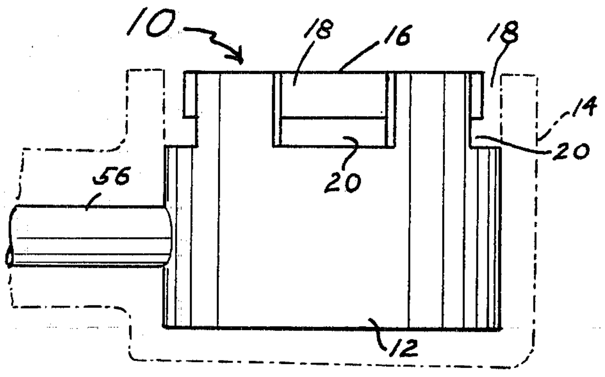
FIG. 1 is a side elevational view of a microphone embodying the invention.
Figure 2:
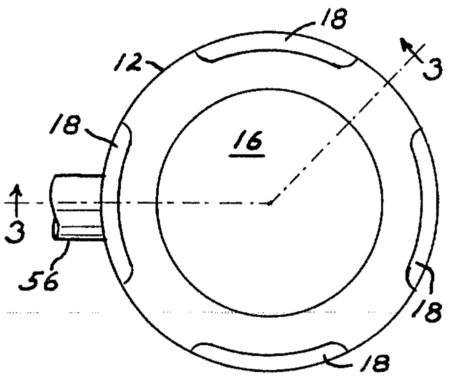
FIG. 2 is a plan view of the microphone of FIG. 1.

In the form of the invention illustrated in the drawings and described hereinafter, a microphone 10 comprises a generally cylindrical, tubular, housing 12 that is adapted to be retained in a rubber boot 14 or the like, forming part of a diver's face mask for example, with an end surface 16 exposed to impingement by sound waves from a diver. The housing 12 is provided with a plurality of relieved zones 18 spaced around the circumference of the exposed end so as to provide airways, between the housing and the boot 14, communicating with a plurality of ports 20 to the interior of the housing, for a purpose which will become apparent as the specification proceeds.

Figure 3:
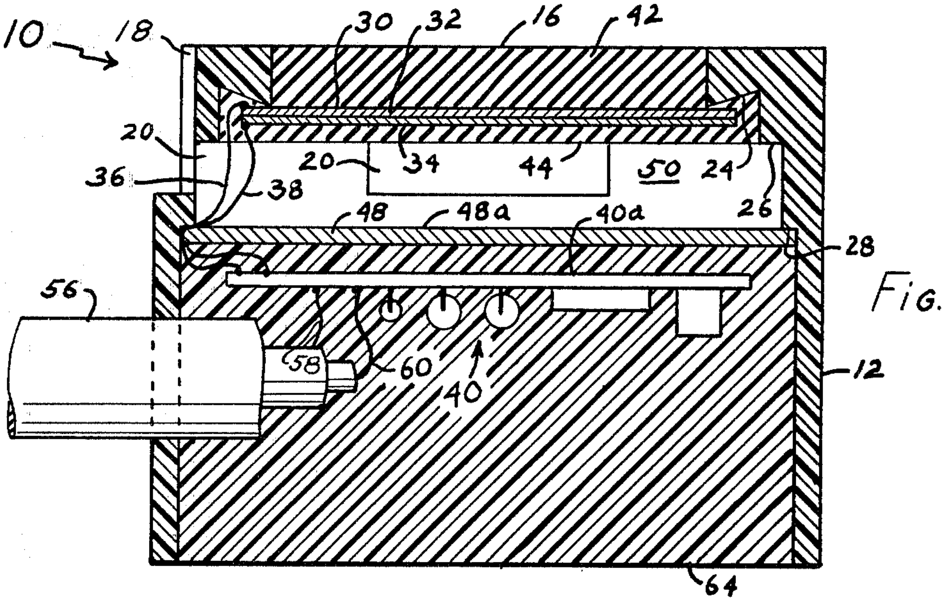
FIG. 3 is a sectional view, on an enlarged scale, taken substantially along line 3—3 of FIG. 2.

Referring more particularly now to FIG. 3, the generally cylindrical housing 12, which before assembly of the microphone components is hollow, is preferably formed of a machineable or moldable rigid synthetic plastic material such as ABS (acrylo-butylstyrene) plastic. The interior of the housing is characterized by stepped interior diameters defining a first annular shoulder 24 that is preferably conical in shape, a second annular shoulder 26 and a third annular shoulder 28. As is best seen in FIG. 3, shoulder 26 is coplanar with the edges of ports 20 adjacent the end surface 16.

A flexible, disc-shaped diaphragm 30, in the form of a piezoelectric crystal bimorph, is disposed in the housing 12 against shoulder 24, the latter making substantially a circular line of contact with the diaphragm due to the conical shape of the shoulder. The diaphragm, which is slightly smaller in diameter than the inside diameter of the portion of the housing between shoulders 24 and 26, is provided on opposite sides with thin conductive electrodes 32, 34, preferably of nickle to avoid or minimize chemical interaction with materials coming in contact therewith. Electrodes 32 and 34 are provided with wire conductors 36 and 38, respectively, leading therefrom for connection to an A.G.C. preamplifier, indicated generally at 40 and having a circuit board or panel 40*a*.

The spaces within the housing 12 above the diaphragm 30, and below the diaphragm to the shoulder 26 are filled with an elastomeric, silicone rubber compound to form protective coatings or layers 42 and 44 on opposite sides of the diaphragm and around the edges thereof. A suitable compound is that sold under the trade name "SYLGARD 186."

A disc-shaped ground or shield plate 48 is disposed within housing 12 against annular shoulder 28. Plate 48 may conveniently comprise a fiber or plastic board having a conductive layer or coating 48*a* thereon or therein which can serve as an electronic interference shield. Plate 48 further serves as a bulkhead or wall that is in spaced relation to the diaphragm 30 and its silicone rubber coating 44 so as to define an air-space 50 within the housing. Air space 50, which is directly behind, or beneath, the coated diaphragm is in communication with ambient pressures due to the ports 20 and relieved areas 18 of the housing.

The mentioned A.G.C. preamplifier 40 is disposed within the portion of housing 12 on the side of ground plate 48 opposite airspace 50. The A.G.C. preamplifier 40 may comprise a separate base panel 52, as shown, or may be mounted directly upon an insulative portion of the ground plate 48. A coaxial cable 56 extends through an opening in the wall of housing 12 into the space therein occupied by the A.G.C. preamplifier 40 and is connected thereto as by conductors 58 and 60. Cable 56 serves both to carry a D.C. voltage as the power supply to the A.G.C. preamplifier and also as the transmission line for voice modulated output signals therefrom. The remainder of the space in the portion of housing 12 occupied by the A.G.C. preamplifier 40 is filled with a suitable waterproof potting compound 64 such as that sold under the tradename "SCOTCHCAST 8."

In a working embodiment of the invention as disclosed herein, the housing 12 has an outside diameter of 1.125 inches, a height of 0.85 inch, while the piezoelectric diaphragm has a diameter of 0.88 inch and a thickness of 0.024 inch. The air space between the coated crystal diaphragm 30 and the ground plate is approximately 0.30 inch. Accordingly, it will be recognized that the accompanying illustrations are on enlarged scales for clarity.

Figure 4:
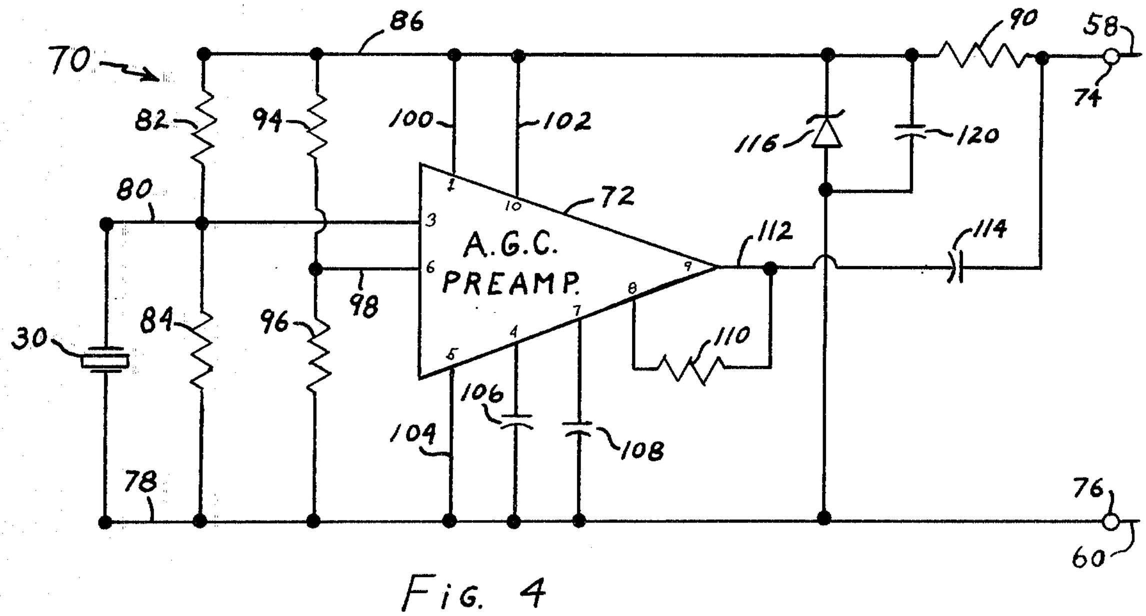
FIG. 4 is a diagrammatic illustration of an A.G.C. preamplifier circuit portion of the microphone.

The particular A.G.C. preamplifier 40 that is used in construction of a microphone according to this invention will be selected for characteristics compatible with the intended use and other amplifying, recording, and/or sound reproducing equipment forming part of the system in which the microphone is to be incorporated. Various suitable A.G.C. preamplifiers of compact design are commercially available and the particular circuitry to be employed is not within the intent of the invention. A circuit 70, that has been used with success as the A.G.C. preamplifier 40 will, however, now be described with reference to FIG. 4. Circuit 70 comprises an A.G.C. preamplifier module 72 of type RM 8341 of Raytheon Company, Lexington, Mass.

A D.C. supply voltage of from 2 to 10 volts with 2 ma. or better current capacity is provided via conductors 58, 60 from cable 56 to input/output terminals 74, 76 of the circuit. The piezoelectric crystal diaphragm 30 is connected, as shown by line 78, to terminal 76, and has its electrical output fed from one electrode thereof via line 80 through a biasing network comprising resistors 82 and 84 to the input terminal of module 72. Resistors 82 and 84 are connected as a voltage divider between conductors 86 and 78, conductor 86 being connected to power supply terminal 74 through an isolating resistor 90. Conductor 78 serves as a ground or common conductor. Resistors 94 and 96 are connected as a voltage divider across conductors 86 and 78 and provide a voltage level on conductor 98 to module 72 that selects the output level at which the automatic gain control takes effect.

Connections 100, 102, 104, provide D.C. power to the amplifier module. A capacitor 106 provides A.C. grounding for the microphone input signals, and a capacitor 108 determines the time constant of the automatic gain control. A resistor 110 is a feedback resistor that controls the maximum gain available from the preamplifier module. The module A.C. output on line 112 is capacitively coupled by capacitor 114 to input/output terminal 74. A zener diode 116, connected across lines 86 and 78, provides voltage regulation, while a capacitor 120, connected in parallel with diode 116, filters the A.C. signal voltage to prevent feedback.

In operation, the output of the circuit 70 should see an A.C. load of 500 ohms or higher, although it will operate with some degradation down to about 250 ohms. The signal can be taken from the transmission line (conductors of cable 56) for further amplification and sound reproduction by either capacitive or transformer coupling, as long as the mentioned A.C. load is maintained. In the present embodiment the maximum gain is conveniently set at approximately 50 db. by selection of resistor 110. The A.G.C. can control up to about 30 db, so the gain in this embodiment can vary from 20–50 db., depending upon the amplitude of the input. Also in this embodiment, the resistors 94 and 96 are selected to limit the output to about 250 to 300 mv.

It has been found that the afore-described diver's microphone construction, owing to the combination of a piezoelectric diaphragm that is coated with an elastomeric waterproof compound and is exposed to ambient air pressures on both sides thereof, together with an A.G.C. preamplifier in a common housing, provides useful microphone sensitivity throughout a wide range of depths characterized by pressures of 1 to more than 30 atmospheres.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A piezoelectric microphone for use in association with diving equipment of a type having molded rubber microphone support means having a recess for holding said microphone in a position for impingement thereon of sound waves, said microphone comprising:

a tubular housing having a generally cylindrical sidewall formed of a rigid electrically insulating material and having a plurality of ports extending therethrough at a predetermined distance from one end thereof, said housing being characterized by a plurality of relieved zones each extending from said one end to a corresponding one of said ports so as to provide air passages between said side wall and said microphone support means, and further characterized by a first internal annular shoulder between said one end and said ports, a second internal annular shoulder coplanar with the edges of said ports adjacent said one end, and a third internal annular shoulder between said ports and the opposite end of said housing, said first annular shoulder being conical;

a piezoelectric crystal bimorph diaphragm disposed in said housing with peripheral portions making line contact with said first annular shoulder;

flexible, elastomeric waterproofing compound formed in protective layers on opposite sides of said diaphragm and filling said housing from said one end to said second annular shoulder;

a ground plate comprising an electrically conductive shielding layer and disposed in said housing with peripheral portions engaging said third annular shoulder, said ground plate and diaphragm defining an airspace therebetween that is adapted by said ports and said relieved zones for communication with pressures within said diving apparatus;

automatic gain control preamplifier means, electrically connected to said diaphragm and disposed in a cavity defined in said housing between said ground plate and said opposite end of said housing, for gain controlled amplification of electrical signals generated by said diaphragm in response to said impingement by said sound waves;

an electrical power and signal transmitting cable extending into said cavity and connected to said automatic gain control preamplifier means; and waterproof potting compound filling the remainder of said cavity around said automatic gain control preamplifier means.

2. A microphone as defined in claim 1, and wherein: said housing is formed of a rigid plastic material; and said flexible elastomeric waterproofing compound comprises a silicone rubber material.

* * * * *